July 24, 1934.  E. H. TAYLOR  1,967,728
METHOD OF MAKING PIPE
Filed Oct. 30, 1931    2 Sheets-Sheet 1

Inventor:
Edward Hall Taylor
By: Brown, Jackson, Boettcher & Dienner,
Attys.

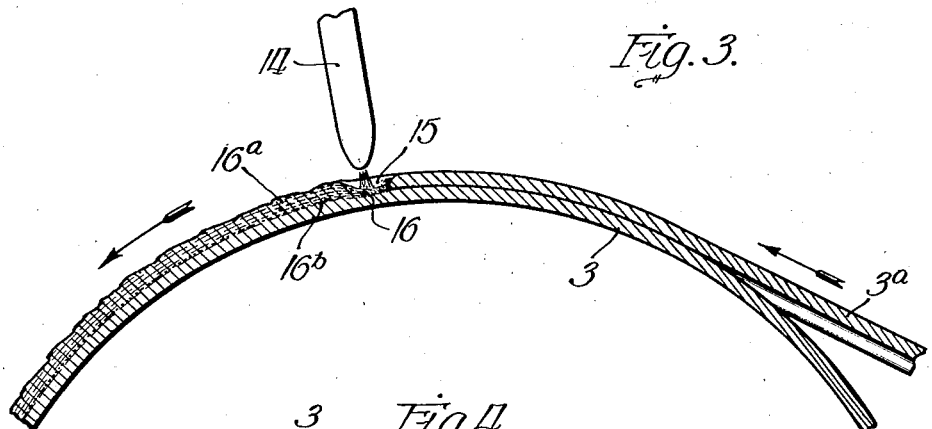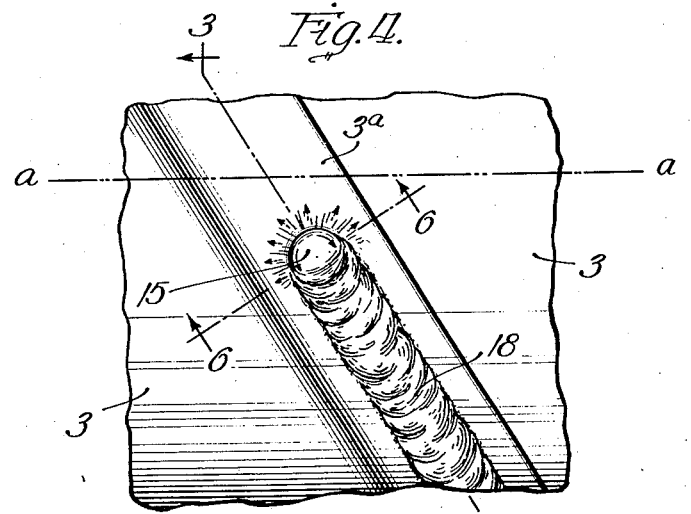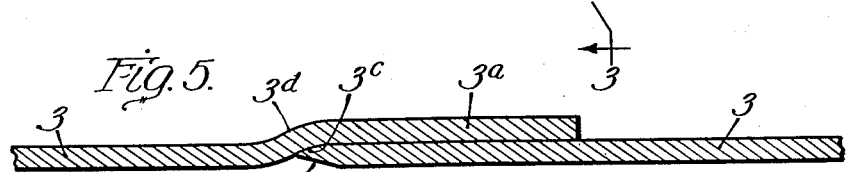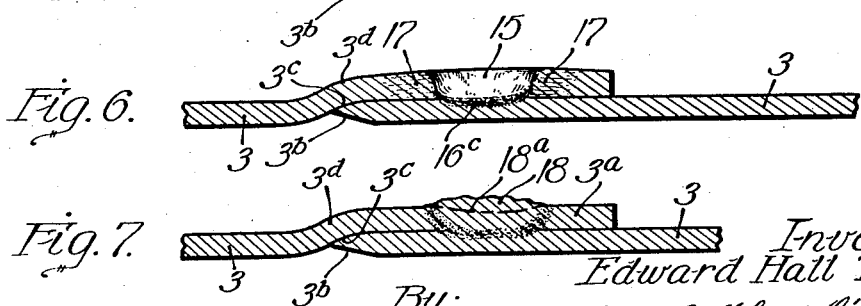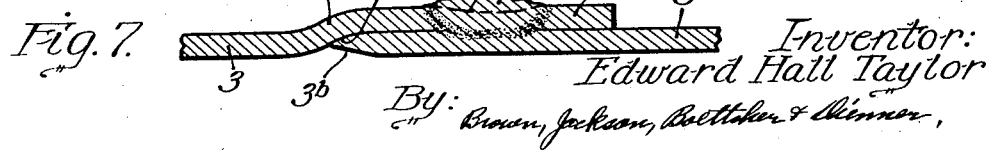
Inventor:
Edward Hall Taylor

Patented July 24, 1934

1,967,728

UNITED STATES PATENT OFFICE 1,967,728

METHOD OF MAKING PIPE

Edward Hall Taylor, Oak Park, Ill.

Application October 30, 1931, Serial No. 572,092

2 Claims. (Cl. 219—10)

This invention relates to spiral pipes and analogous tubular articles, and has to do more particularly with spiral pipe of novel and improved construction in which the convolutions of the pipe are welded together, and with the method of welding the pipe.

It is known to produce pipe by winding metal strip spirally with a lap joint between adjacent convolutions of the strip, the convolutions being welded together along the edge of the overlap of the joint. This form of pipe is open to the objection that if any portion of the weld is defective or incomplete, leakage is apt to occur at such portion, particularly if the pipe be used to conduct fluids under pressure. A further objection to welding along the edge of the overlap is that the weld is exposed and subject to corrosion, particularly if a flux is used in the welding operation, as is the common practice.

One of the main objects of my invention is to provide a spiral pipe in which the convolutions are welded together in such manner that the weld is effectively protected from corrosion or injury. A further object is to provide a pipe of this character in which the convolutions are secured together by a lap joint, the overlap of this joint being shrunk tightly about the underlap so as to effectively reenforce the pipe at the joint and provide a tight closure or seal between the laps of the joint at opposite sides of the weld. It is also an object of my invention to provide an improved method of welding whereby the aforementioned results are attained. Further objects and advantages of my invention will appear from the detailed description.

Figure 3 is a fragmentary sectional view through the upper portion of the pipe, illustrating the method of my invention, taken substantially on line 3—3 of Figure 4;

Figure 4 is a fragmentary plan view of a pipe constructed in accordance with my invention, a portion of the pipe being unwelded;

Figure 5 is a fragmentary sectional view through the joint and adjacent portions of the pipe prior to welding thereof;

Figure 6 is a section taken substantially on line 6—6 of Figure 4;

Figure 7 is a view similar to Figure 5 after the welding together of the laps of the joint has been completed.

In producing pipe and analogous tubular articles in accordance with my invention, metal strip is wound spirally to form a cylinder with a lapped joint between the edges of adjacent convolutions thereof, the cylinder being rotated on its axis and advanced lengthwise thereof. Preferably, I employ a machine similar to that disclosed in the co-pending application of James Hall Taylor, for Method of welding spiral pipe, Serial No. 567,822, filed October 9, 1931, for winding the metal strip in the manner set forth. This machine, in its general construction and operation, is quite similar to the spiral pipe forming machine disclosed in the patent to James Hall Taylor, No. 972,731, dated October 11, 1910.

Figure 1:
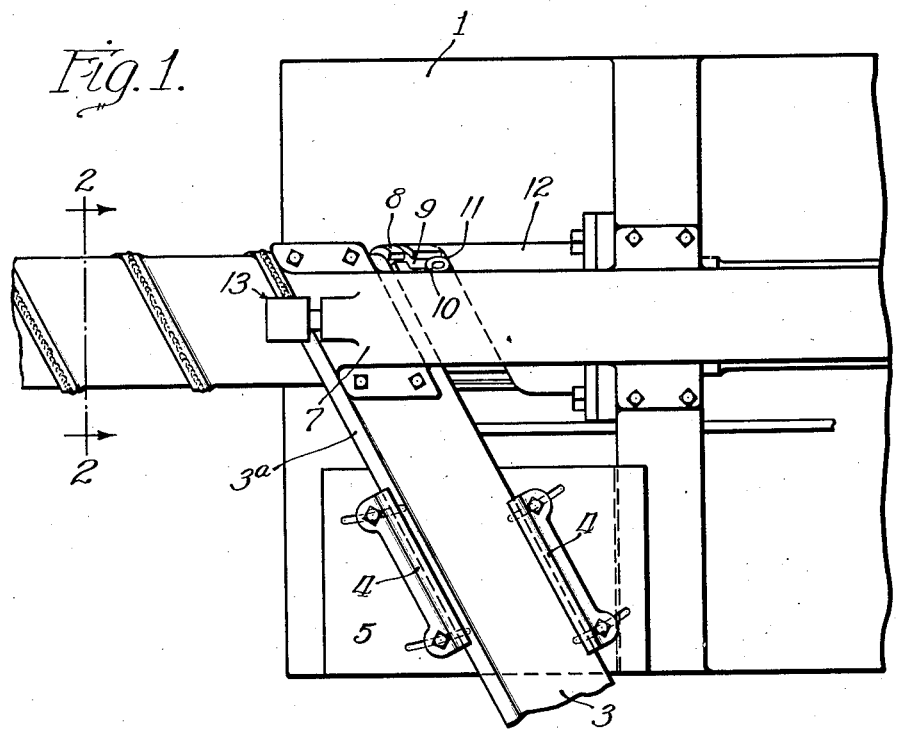
Figure 1 is a fragmentary plan view of a spiral pipe winding machine illustrating a pipe being wound and welded in accordance with my invention.
Figure 2:
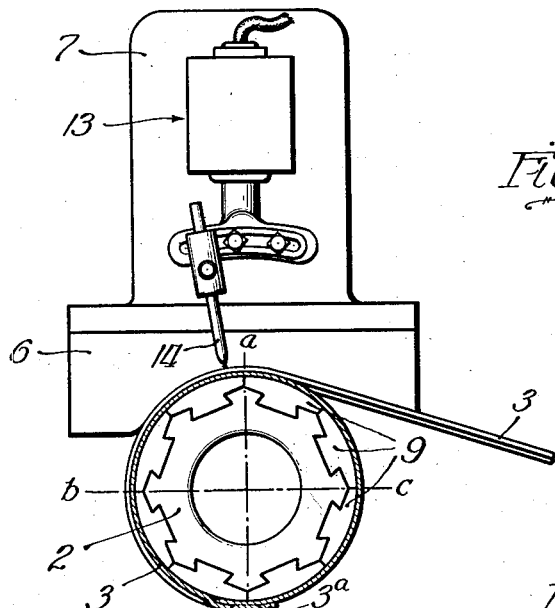
Figure 2 is a fragmentary front view of the machine and the associated welding means, taken substantially on line 2—2 of Figure 1.

The machine for winding the metal strip is shown fragmentarily in plan in Figure 1, and is designated by the reference character 1. It comprises a mandrel 2 which is rotated in a suitable manner and in a counterclockwise direction as viewed in Figure 2 for spirally winding upon the mandrel metal strip or skelp 3. This metal strip passes beneath suitable guides 4 and over a table 5 to which the guides are adjustably secured. Strip 3 passes between the mandrel 2 and a forming plate or block 6 suitably secured to head frame 7 of the machine.

The under face of the block 6 extends about the upper portion of the mandrel and is so spaced therefrom as to hold the strip snugly about the mandrel and form it to the curvature thereof during winding of the strip. The mandrel is provided with abutment elements 8 extending spirally about the same and disposed for contact with the rearward edge of strip 3 as it is wound upon the mandrel. The abutment members 8 are in the form of ribs projecting from members 9 slidable lengthwise of the mandrel, each of these members having a roller 10 which contacts forward edge 11 of a barrel 12 through which the mandrel extends. Edge 11 of the barrel 12 extends spirally about the mandrel and cooperates with the rollers 10 and abutments or ribs 8 of members 9 for advancing the wound metal strip along the mandrel, and suitable means is provided for successively returning the members 9 to their rearmost position after such members have been moved into their foremost position. Further description and illustration of the winding machine is not necessary here, it being sufficient to note that I provide suitable means for winding the metal strip into cylindrical form and advancing the cylinder as it is formed, which can be accomplished by the machine illustrated and described, or by any other suitable means.

A head 13, of known type, for supporting a carbon rod to produce an electric arc for heating is adjustably secured in a suitable manner upon the head frame 7 of the machine. A carbon electrode 14 is suitably mounted in the head 13. This electrode is disposed radially of the formed cylinder and in advance of the vertical plane a—a of the axis thereof in the direction of rotation of the cylinder. The electrode 14 is also disposed above the horizontal plane b—c of the axis of the formed cylinder, preferably at the upper portion of the upper quadrant a—b thereof. The lower end of the electrode is spaced a proper distance above the wound metal strip and constitutes a point beneath which the joint of adjacent convolutions of the wound strip is moved during winding and advancement of the strip.

The leading edge of the metal strip 3 is offset outwardly to provide an overlap element 3a and the following edge of the strip is beveled at 3b from its inner face and has its outer face rounded at 3c so as to fit snugly beneath the inclined shoulder 3d connecting element 3a to the body of the strip, the beveled edge 3b fitting closely against shoulder 3d so as to avoid any objectionable projections or sharp edges on the interior of the pipe, as in Figure 5. As the strip is wound onto the mandrel, element 3a at the leading edge of each convolution is disposed in overlapping relation to the following edge portion of the next preceding convolution in close contact therewith so as to provide a lap joint between the convolutions. Electrode 14 is so disposed that the central portion of overlap 3a of this joint passes beneath the electrode during the winding and advancement of the strip.

When the circuit of electrode 14 is closed, an electric arc is created between this electrode and the wound strip or cylinder remote from the leading edge of overlap 3a. This arc is intensely hot and quickly melts the metal at the intermediate portion of the overlap of the joint and throughout the entire thickness of such overlap. The overlap shields the underlap, to a considerable extent, from the intense heat of the arc, but the subjacent portion of the underlap is heated sufficiently to be melted or fused to a slight depth, and to a sufficient glow to remove the scale from the outer surface thereof and provide a clean surface for welding, so as to assure that the molten metal of the overlap will unite with the metal of the underlap and form a continuous weld between the laps of the joint.

The heat produced by the electric arc is sufficient to melt the metal of the overlap for a restricted area, producing an opening or hole 15 in the overlap remote from the leading edge thereof. Due to the disposition of the electrode 14, and the direction of winding of the strip 3 onto the mandrel, the molten metal tends to flow downwardly about the joint at the central portion of the overlap. The metal of the two laps unites so as to form a weld therebetween, and the flow of the molten metal is stopped by the previously molten and chilled metal which thus acts to puddle the molten metal of the overlap so as to assure intimate union thereof with the metal of the underlap. As the metal of the overlap is melted, it flows by gravity and capillarity about the opening 15 at the upper portion thereof to the lower portion of this opening where it is puddled by the previously molten metal which has chilled, as above noted. As the cylinder is wound and advanced, the area of melting of the metal is advanced along the joint to form a continuous weld between the laps simultaneously with the winding of the metal strip to form the cylinder.

Referring more particularly to Figure 3, 16 indicates the molten metal of the overlap which flows about the opening 15 to the lower portion thereof, this molten metal being puddled by the previously molten and chilled metal 16a. The metal of the overlap serves to shield the underlap from the intense heat of the arc, to a considerable extent, so that the metal at the outer face of the underlap is melted to a slight depth only as indicated at 16d. It is not essential that the metal of the underlap be actually fused or melted sufficiently to cause flow thereof, so long as the metal of the underlap is heated sufficiently to assure proper union thereof with the molten metal of the overlap. This is particularly advantageous as avoiding melting of the underlap for the full thickness thereof, which would necessitate the provision of a support for the underlap beneath and adjacent the electrode. By my method, the necessity for such a support is avoided, which eliminates dissipation of heat from this cause and facilitates the welding operation.

As previously noted, the point at which the overlap of the joint is melted, is remote from the leading edge of the overlap. The leading or forward edge portion of the overlap is in close contact with the underlap and readily transfers heat to the latter, with the result that the leading edge portion of the overlap is maintained at a considerably lower temperature than the metal in and adjacent the area within which the metal is melted by the heat of the arc. The metal adjacent the opening 15 which is melted through the overlap is rendered plastic by the intense heat generated and, as a result of such heat, this metal tends to expand radially of the opening 15 as indicated by the dotted line arrows of Figure 4. This relatively hot metal at the intermediate portion of the overlap expands at a much greater rate than the relatively cold metal at the edge portions of the overlap, this expansion resulting in thickening or upsetting the metal at the edge portions of the overlap. Prior to the welding operation, the overlap is of uniform thickness and is in close contact with the underlap, as in Figure 5. During the welding operation, the metal at each side of the restricted area of melting tends to expand and causes upsetting or thickening of the metal at each side of the line of the weld, as at 17 in Figure 6. As the metal of the weld 18 chills, the metal along each side of the weld cools and contracts with the result that the overlap is shrunk tightly about the underlap so as to form a tight closure or seal therewith. In Figure 6, the thickening of the metal at the lateral portions of the overlap, due to the expansion caused by heating in the welding operation, is exaggerated for purposes of illustration. In practice, however, the metal at the lateral portions of the overlap will be thickened to a certain extent, and as this thickened metal cools the overlap will be shrunk tightly about the underlap.

After the welding operation has been completed, and the metal of the overlap has cooled, the two laps are united by the weld 18 which is continuous and is disposed between the edges of the overlap. Since the overlap is shrunk tightly about the underlap so as to provide a tight seal therewith, the weld is effectively enclosed and sealed so as to be guarded from injury and deterioration, such as corrosion. A further advantage of welding at the central portion of the overlap is that the overlap is shrunk sufficiently tightly about the underlap to provide an effective seal or closure therewith in the event that the weld between the overlap and the underlap is defective or incomplete for a portion thereof.

While I preferably weld the laps of the joint together simultaneously with the winding and advancement of the metal strip, this is not essential to my invention which comprehends the winding and welding of the strip either as a continuous operation or as separate steps in the method of my invention. Also, while I have described the use of an electric arc for melting the metal of the overlap of the joint, any other suitable or preferred means for melting the metal or heating it to suitable welding temperature may be employed.

The term "lap joint" is used herein to denote generally a joint in which two members are disposed in lapped relation, and is to be construed restrictively only in such instances as the context renders such narrowed construction necessary.

If found desirable, additional metal for the weld may be provided, as by feeding a metal ribbon or rod to the arc in an appropriate manner. When this is done, the metal of the weld may extend somewhat beyond the outer face of the overlap of the joint, as shown in full lines in Figure 7. In instances where additional metal for the weld is not provided, the metal of the weld will be approximately flush with, or may be slightly below, the outer face of the overlap, as indicated by the dot and dash line 18a of Figure 7.

What I claim is:
1. The method of making pipe, which comprises winding a ribbon of metal spirally with the margins of adjacent convolutions overlapping, stretching the outer margin over the inner margin, thereby forming a cylindrical structure of substantially uniform diameter and with the overlapping margins in close contact, applying an arc welding electrode to one of said margins between the planes of the edges of said margins and melting through the same and heating the other margin to a welding temperature, to one side of the vertical plane of the axis of the cylindrical structure, while rotating said cylindrical structure and moving it axially relative to said electrode, whereby to produce a continuous zone of welding between and parallel to the edges of said overlapping margins.

2. The method of making pipe, which comprises winding a ribbon of metal spirally with the margins of adjacent convolutions overlapping, stretching the outer margin over the inner margin, thereby forming a cylindrical structure of substantially uniform diameter and with the overlapping margins in close contact, applying an arc welding electrode to one of said margins between the planes of the edges of said margins and melting through the same and heating the other margin to a welding temperature, to one side of the vertical plane of the axis of the cylindrical structure, while rotating said cylindrical structure and moving it axially relative to said electrode, whereby to produce a continuous zone of welding between and parallel to the edges of said overlapping margins, and cooling said cylindrical structure, whereby the outer margin is shrunk upon the inner margin.

EDWARD HALL TAYLOR.